United States Patent
Ho et al.

(10) Patent No.: US 10,635,940 B1
(45) Date of Patent: Apr. 28, 2020

(54) SYSTEMS AND METHODS FOR UPDATING IMAGE RECOGNITION MODELS

(71) Applicant: Capital One Services, LLC, McLean, VA (US)

(72) Inventors: Chi-san Ho, Allen, TX (US); Micah Price, Plano, TX (US); Sunil Subrahmanyam Vasisht, Frisco, TX (US); Aamer Charania, Flower Mound, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/254,568

(22) Filed: Jan. 22, 2019

Related U.S. Application Data

(60) Provisional application No. 62/778,287, filed on Dec. 11, 2018.

(51) Int. Cl.
*G06K 9/62* (2006.01)
*G06N 20/00* (2019.01)

(52) U.S. Cl.
CPC .......... *G06K 9/6257* (2013.01); *G06K 9/6267* (2013.01); *G06N 20/00* (2019.01); *G06K 2209/23* (2013.01)

(58) Field of Classification Search
CPC ............... G06K 9/6257; G06K 9/6267; G06K 2209/23; G06N 20/00
USPC ..................... 382/156, 164; 706/46; 709/224
See application file for complete search history.

(56) References Cited

U.S. PATENT DOCUMENTS

| | | | | |
|---|---|---|---|---|
| 8,041,115 B2* | 10/2011 | Liu | ...................... | G06K 9/6269 |
| | | | | 382/103 |
| 9,842,280 B2* | 12/2017 | Hsu | ....................... | G06K 9/6231 |
| 10,089,575 B1* | 10/2018 | Redmon | .................. | B25J 9/163 |
| 10,140,553 B1* | 11/2018 | Vasisht | .................... | G06N 3/02 |
| 10,339,622 B1* | 7/2019 | Tang | .................. | G06K 9/00671 |
| 10,423,855 B2* | 9/2019 | Cameron | ............. | G06K 9/6221 |
| 10,460,209 B2* | 10/2019 | Li | ......................... | G06K 9/6292 |
| 2005/0210127 A1* | 9/2005 | Pohja | .................. | H04M 3/2281 |
| | | | | 709/224 |
| 2012/0143808 A1* | 6/2012 | Karins | ................... | G06N 7/005 |
| | | | | 706/46 |
| 2015/0036919 A1* | 2/2015 | Bourdev | .............. | G06K 9/6256 |
| | | | | 382/156 |

(Continued)

*Primary Examiner* — Xuemei G Chen
(74) *Attorney, Agent, or Firm* — Finnegan, Henderson, Farabow, Garrett & Dunner, LLP

(57) ABSTRACT

The present disclosure relates to systems and methods for training image recognition models. The system may include a processor in communication with a client device, and a storage medium storing instructions that, when executed, cause the processor to perform operations including storing, in a database, a plurality of images depicting vehicles; determining, for a first subset of the images, that additional images of the vehicles depicted in the first subset are desired; determining, for a second subset of the images, that additional images of the vehicles depicted in the second subset are not desired; identifying, within the first subset, images suitable for training an image recognition model; assigning a classification to the suitable images; determining, based on the classification, whether a threshold number of images exist in the database; and initiating an update of the image recognition model, based on the determination of whether the threshold number of images exists.

15 Claims, 8 Drawing Sheets

(56) References Cited

U.S. PATENT DOCUMENTS

| | | | |
|---|---|---|---|
| 2016/0027187 A1* | 1/2016 | Wang | G06T 7/73 |
| | | | 382/164 |
| 2017/0069081 A1* | 3/2017 | Gluncic | A61B 6/12 |
| 2018/0315167 A1* | 11/2018 | Akiyama | G06T 5/00 |
| 2018/0336426 A1* | 11/2018 | Suzuki | G01C 21/3602 |
| 2019/0050670 A1* | 2/2019 | Pogorelik | G06K 9/6202 |
| 2019/0065989 A1* | 2/2019 | Kida | G06N 20/00 |

\* cited by examiner

"Make 1|Model A|SUV|2012": 1,
"Make 2|Model B|SUV|2009": 27,
"Make 3|Model C|Sedan|2011": 28,
"Make 4|Model D|Wagon|2010": 72,
"Make 3|Model C|Hatchback|2013": 73,
"Make 3|Model C|Coupe|2006": 155,
"Make 5|Model E|SUV|2006": 155,
"Make 6|Model F|Wagon|2010": 205,
"Make 6|Model G|SUV|2008": 260,
"Make 4|Model D|Coupe|2012": 201,
"Make 7|Model H|Sedan|2015": 250,
"Make 4|Model D|Sedan|2009": 227,

SYSTEMS AND METHODS FOR UPDATING IMAGE RECOGNITION MODELS

PRIORITY CLAIM

This application claims priority under 35 U.S.C. § 119 to U.S. Provisional Application No. 62/778,287, filed on Dec. 11, 2018, and entitled "Systems and Methods for Updating Image Recognition Models," which is expressly incorporated herein by reference in its entirety.

TECHNICAL FIELD

The present disclosure relates generally to the field of image analysis using machine learning processes. More specifically, and without limitation, this disclosure relates to systems and methods for using machine learning processes to identify vehicles from images and generate real-time quotes.

BACKGROUND

Image recognition models can provide a powerful tool for quickly identifying objects depicted in images, and processes for training and employing such image recognition have improved greatly in recent years. Improvements in computers allow vast quantities of images to be processed to train such models. However, more is not always better when it comes to such training.

Existing methods for training image recognition models may focus on incorporating as many images as possible, which may improve accuracy for some targets of identification, while doing little to improve accuracy for others. For example, an image recognition model for identifying vehicles may become very well trained to identify popular models of vehicles, while becoming insufficiently trained at identifying less popular models.

A focus strictly on quantity of source images may result in vast quantities of computer resources devoted to training the image recognition model as to popular models of vehicles, while incorporating too few images of less popular models to accurately identify them.

A need therefore exists for systems and methods for improved training of image recognition models.

SUMMARY

Embodiments of the present disclosure use machine learning systems and methods to train image recognition models, emphasizing control over model quality via image classification. In this manner, the disclosed embodiments can provide a marked improvement over the quantity-focused methods of the prior art.

Disclosed embodiments may include a system for updating an image recognition model. The system may comprise one or more processors and a storage medium storing instructions. When executed, the instructions may configure the processor to perform operations comprising storing, in a database, a plurality of images depicting vehicles; determining, for a first subset of the vehicle images, that additional images of the vehicles depicted in the first subset are desired; determining, for a second subset of the vehicle images, that additional images of the vehicles depicted in the second subset are not desired; identifying, within the first subset, images suitable for training an image recognition model; assigning a classification to the suitable images; determining, based on the classification, whether a first threshold number of images exist in the database; and initiating an update of the image recognition model, based on the determination of whether the first threshold number of images exists.

Disclosed embodiments may include a method for processing an image including a vehicle using machine learning. The method may include storing, in a database, a plurality of images depicting vehicles; determining, for a first subset of the vehicle images, that additional images of the vehicles depicted in the first subset are desired; determining, for a second subset of the vehicle images, that additional images of the vehicles depicted in the second subset are not desired; identifying, within the first subset, images suitable for training an image recognition model; assigning a classification to the suitable images; determining, based on the classification, whether a first threshold number of images exist in the database; and initiating an update of the image recognition model, based on the determination of whether the first threshold number of images exists.

Consistent with additional embodiments of the present disclosure, a computer-readable medium is disclosed that stores instructions that, when executed by a processor(s), causes the processor(s) to perform operations consistent with one or more disclosed methods.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings:

FIG. 7 is an exemplary dataset displaying a tally of classified images, consistent with disclosed embodiments.

DETAILED DESCRIPTION

The disclosed embodiments relate to systems and methods for updating image recognition models. Reference will now be made in detail to exemplary embodiments and aspects of the present disclosure, examples of which are illustrated in the accompanying drawings. While numerous specific details are set forth in order to provide a thorough understanding of the disclosed example embodiments, it would be understood by those skilled in the art that the principles of the example embodiments may be practiced without every specific detail. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings.

As used herein, the term "image" may connote digital information stored in an appropriate format, for example, static image formats (e.g., bitmap, Graphics Interchange Format ("GIF"), Portable Network Graphics format ("PNG"), Joint Photographic Experts Group ("JPEG")) or dynamic formats (e.g., animated GIF, MPEG-4, Flash Video ("FLV"), Windows Media Video ("WMV")).

Figure 1:
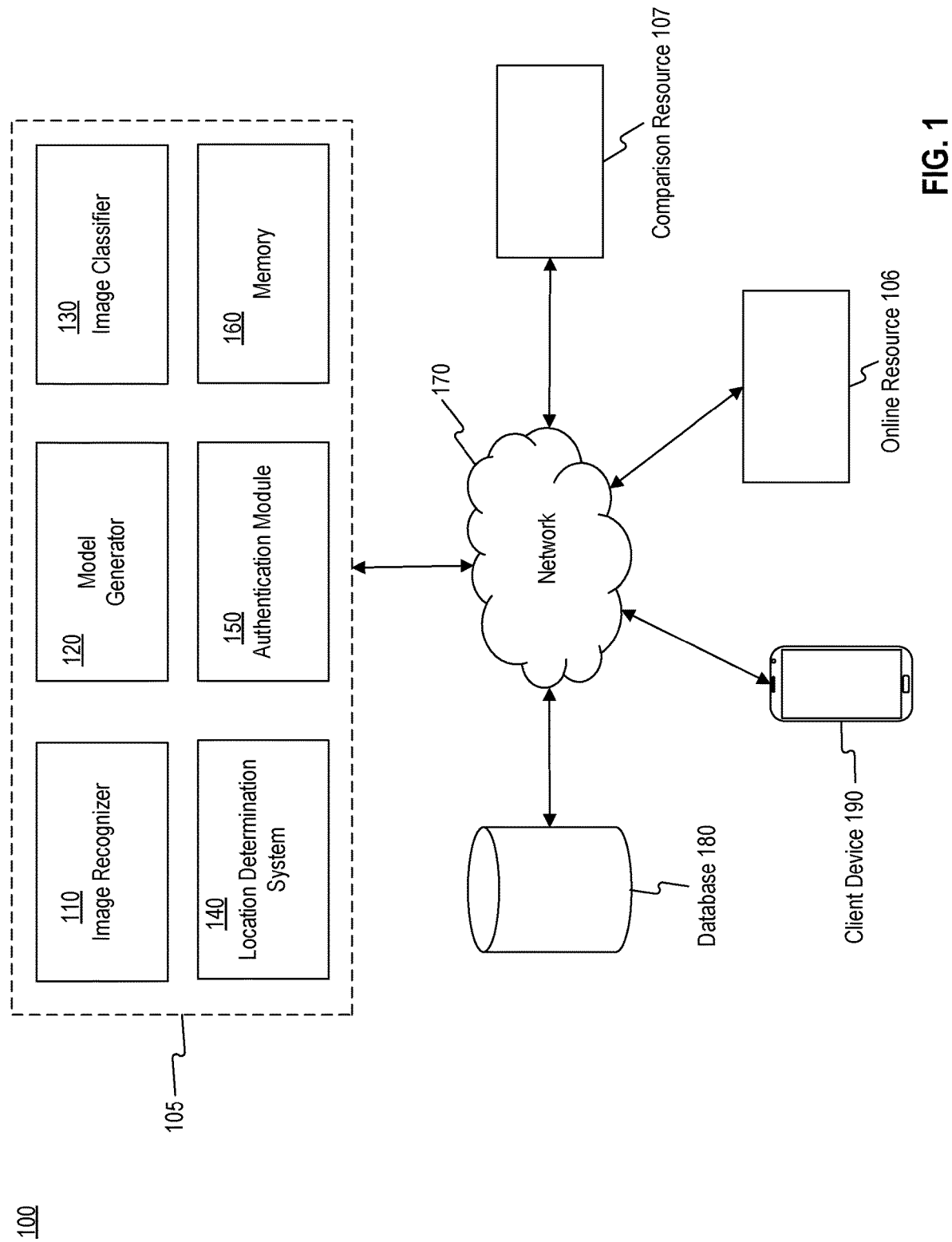
FIG. 1 is a block diagram of an exemplary system for updating an image recognition model, consistent with disclosed embodiments.

FIG. 1 is a block diagram of an exemplary system 100 for updating an image recognition model. System 100 may be used to identify an object based on attributes visible in images of the object. For example, system 100 may be configured to identify a vehicle and associated vehicle attributes (e.g., make, model, trim line, year, color, etc.) based on an image of the vehicle, consistent with disclosed embodiments. System 100 may include a server system 105 which may include an image recognizer 110, a model generator 120, an image classifier 130, a location determination system 140, an authentication module 150, and a memory 160. System 100 may additionally include online resource 106, comparison resource 107, database 180, and client device 190. In some embodiments, as shown in FIG. 1, each component of system 100 may be connected to a network 170. However, in other embodiments components of system 100 may be connected directly with each other, without network 170.

Online resource 106 may include one or more servers or storage services provided by one or more service providers, such as a provider of website hosting, networking, cloud, or backup services. In some embodiments, online resource 106 may be associated with hosting services or servers that store web pages for vehicle manufacturers and/or vehicle dealers. In other embodiments, online resource 106 may be associated with a cloud computing service such as Microsoft Azure™ or Amazon Web Services™. In yet other embodiments, online resource 106 may be associated with a messaging service, such as, for example, Apple Push Notification Service, Azure Mobile Services, or Google Cloud Messaging. In such embodiments, online resource 106 may handle the delivery of messages and notifications related to functions of the disclosed embodiments, such as image compression, notification of identified vehicles alerts, and/or completion messages and notifications.

Comparison resource 107 may include one or more servers or storage services configured to store comparison information. In some aspects, the servers or storage services can host one or more resources provided by one or more service providers. Comparison information can include pricing information, vehicle-related information, and personal information. In some embodiments, comparison information can include records of vehicle financing transactions, such as vehicle financing applications submitted by other users of system 100. Pricing information can include vehicle prices, monthly payment amounts, APRs, term lengths, warranty products typically purchased (e.g., tire protection plans, extended warranties), and/or amounts financed. Vehicle-related information can include vehicle make, model, vehicle identification number, color, trim line, mileage, dealership of lease or purchase, geographic area of lease or purchase (zip code, city, state, etc.), date of lease or purchase, and/or other information potentially affecting the price of a vehicle. Personal information can include demographic (e.g., age), financial (e.g., income, credit rating), residence (e.g., home address), and/or prior behavior information (e.g. driving record) of purchasers. In some embodiments, comparison resource 107 can be configured to store comparison information in one or more databases. The databases can be configured to allow retrieval of comparison information according to one or more of pricing information, vehicle-related information, and personal information. For example, comparison resource 107 can be configured to allow another component of system 100 (e.g., system 105) to retrieve at least a subset of comparison information (e.g., pricing information) concerning a particular vehicle make, model, and trim line. In some embodiments, comparison resource 107 can include information concerning customers of a financial service provider. In some aspects, the financial service provider can be associated with one or more other components of system 100, such as system 105.

Client device 190 may include one or more computing devices configured to perform operations consistent with disclosed embodiments. For example, client device 190 may include at least one of a desktop computer, a laptop, a server, a mobile device (e.g., tablet, smart phone, etc.), a gaming device, a wearable computing device, or other type of computing device. Client device 190 may include one or more processors configured to execute software instructions stored in memory, such as memory included in client device 190. Client device 190 may include software that when executed by a processor performs Internet-related communication and content display operations. For instance, client device 190 may execute browser software that generates and displays interfaces including content on a display device included in, or connected to, client device 190. Client device 190 may execute applications that allow client device 190 to communicate with components over network 170, and generate and display content in interfaces via a display device included in client device 190. The disclosed embodiments are not limited to any particular configuration of client device 190. For instance, client device 190 can be a mobile device that stores and executes mobile applications that interact with server system 105 and/or online resource 106 to perform aspects of the disclosed embodiments, such as providing information about vehicles in database 180. In certain embodiments, client device 190 may be configured to execute software instructions relating to location services, such as GPS locations. For example, client device 190 may be configured to determine a geographic location and provide location data and time stamp data corresponding to the location data. In yet other embodiments, client device 190 may capture video and/or images.

Database 180 may include one or more computing devices configured to provide vehicle data to one or more of server system 105, model generator 120, and image classifier 130. In some aspects, such vehicle data can include vehicle inventory listings, vehicle images, vehicle features, and stored information about vehicle sales like cost or condition. Database 180 may include, for example, one or more Oracle™ databases, Sybase™ databases, or other relational databases or non-relational databases, such as Hadoop™ sequence files, HBase™, Cassandra™. Database(s) 180 may include computing components (e.g., database management system, database server, etc.) configured to receive and process requests for data stored in memory devices of the database(s) and to provide data from the database(s).

While database 180 is shown separately, in some embodiments database 180 may be included in or otherwise related to one or more of server system 105, image recognizer 110, model generator 120, image classifier 130, and online resource 106.

Database 180 may be configured to collect and/or maintain vehicle data for vehicles displayed using online resource 106. Database 180 can be configured to provide such data to the server system 105, model generator 120, image classifier 130, and client device 190. Database 180 may collect this data from a variety of sources, including, for instance, online resource 106. Database 180 is further described below in connection with FIG. 3.

Image classifier 130 may include one or more computing systems configured to collect and process images, and may be configured to use the processed images to create training data sets. Consistent with disclosed embodiments, these training data sets can be used to develop an identification model. For example, image classifier 130 may include an image collector that collects images for use in training a linear regression classifier or a convolutional neural network. In some embodiments, image classifier 130 can be configured to communicate with online resource 106 and to detect changes in online resource 106. In some embodiments, detection of such changes can cause image classifier 130 to collect images and begin the classification process.

Model generator 120 may include one or more computing systems configured to generate models to identify a vehicle using a vehicle image. Model generator 120 may be configured to receive or obtain information from database 180, online resource 106, and/or image classifier 130. For example, model generator 120 may receive a plurality of images from database 180 and online resource 106. As an additional example, model generator 120 may also receive images and metadata from image classifier 130.

In some embodiments, model generator 120 may receive requests from image recognizer 110. As a response to such a request, model generator 120 may generate one or more identification models. In some aspects, the identification models may include deep learning approaches, such as convolutional neural networks (CNN) that determine attributes in an image based on features extracted from the image. In various aspects, identification models may include statistical analyses. After training with a set of training images, these statistical analyses can determine a similarity between images. For example, identification models may include regression models that estimate the relationships among input and output variables. In some aspects, identification models may additionally sort elements of a dataset using one or more classifiers to determine the probability of a specific outcome.

Statistical identification models may be parametric, non-parametric, and/or semi-parametric models. A convolutional neural network model can be configured to process an image into a collection of features. The convolutional neural network can comprise an input layer, one or more middle layers, and one or more output layers. An image can be applied to the input layer. In some embodiments, the input layer can comprise multiple matrices (e.g., a matrix for each of the red, green, and blue pixel values in an RGB image). In some embodiments, the input layer can comprise a single matrix (e.g., a single two-dimensional matrix of pixel brightness values). In some aspects, each middle layer and the output layer can be a deterministic function of the values of the preceding layer.

The convolutional neural network can include one or more convolutional layers. Each convolutional layer can be configured to convolve one or more spatial filters with the convolutional layer input to generate a convolutional layer output tensor. Each spatial filter function can be defined by a matrix of weights to be applied to each element of the preceding layer during a convolution operation, an offset, and an activation function. Training the convolutional neural network can comprise modifying the weights and offsets using backpropagation. In some embodiments, the convolutional neural network can also include pooling layers and fully connected layers according to methods known in the art. Identification models may also include decision tree based methods, such as classification and regression tree (CART), Gradient Boosted Machines (GBM), and Random Forests, composed of a combination of decision tree predictors. Such decision trees may comprise a data structure mapping observations about something, in the "branch" of the tree, to conclusions about that thing's target value, in the "leaves" of the tree. Each tree may depend on the values of a random vector sampled independently and with the same distribution for all trees in the forest. Identification models may additionally or alternatively include Support Vector Machines (SVM), logistic regression, or other types of models known to those skilled in the art.

Model generator 120 may be configured to submit models to identify a vehicle. To generate identification models, model generator 120 may analyze images that are classified by the image classifier 130, applying machine learning methods. Model generator 120 may communicate with server system 105 via network 170 or other communication avenues.

Image recognizer 110 may be configured to identify vehicles based on images of vehicles. In some embodiments, Image recognizer 110 may receive a request to identify a vehicle in an image. Image recognizer 110 may receive the request directly from client device 190. Alternatively, image recognizer 110 may receive the request from other components of system 100. For example, client device 190 may send requests to online resource 106, which then sends requests to server system 105. The request may include an image of a vehicle and a location of client device 190. In other embodiments, the request may include a video file or a streaming video feed.

As a response to identification requests, server system 105 may request identification models from model generator 120. The request may include information about the image source, for example, an identification of client device 190. The request may additionally specify a location. In addition, image recognizer 110 may retrieve information from database 180.

Image recognizer 110 may generate an identification result based on the information received from the client request and transmit the information to the client device. Image recognizer 110 may generate instructions to modify a graphical user interface to include identification information associated with the received image.

FIG. 1 shows image recognizer 110, model generator 120, and image classifier 130 as different components. However, image recognizer 110, model generator 120, and image classifier 130 may be implemented in the same computing system.

Location determination system 140 may include one or more computing systems configured to perform operations consistent with determining a location of a client device 190. In some embodiments, location determination system 140 may transmit a request to client device 190 for location information. In response to the request, client device 190 may transmit location information such as geographic coordinates or identifiers to the location determination system 140 via network 170. The location determination system 140 may map the geographic coordinates or identifiers to a specific geographic location. The location determination system 140 may include satellite based geolocation systems, e.g., GPS, Glonass, Galileo, etc.; long range terrestrial geolocation systems, e.g., LORAN; short-range network based geolocation systems, e.g., network based cellular e911; short range proximity location sensing, e.g., 802.11 access point identification, line-of-sight location identification, e.g., IRdA or other visible, sonic or invisible electromagnetic waves which are confined by barriers; RFID based location detectors; and the like.

Authentication module 150 may include one or more computing systems configured to perform operations consistent with authenticating a user. In some embodiments, a user registers for an account and creates a user name and password. The user account information, including the user name and password, may be stored in memory 160, for example. To access the user account, a registered user can provide the user name and password information to the authentication module 150 via client device 190. Authentication module 150 can be configured to authenticate the user based on the received user name and password information.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In some embodiments, one or more components of system 100 can communicate through network 170. In various embodiments, one or more components of system 100 may communicate directly through one or more dedicated communication links.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
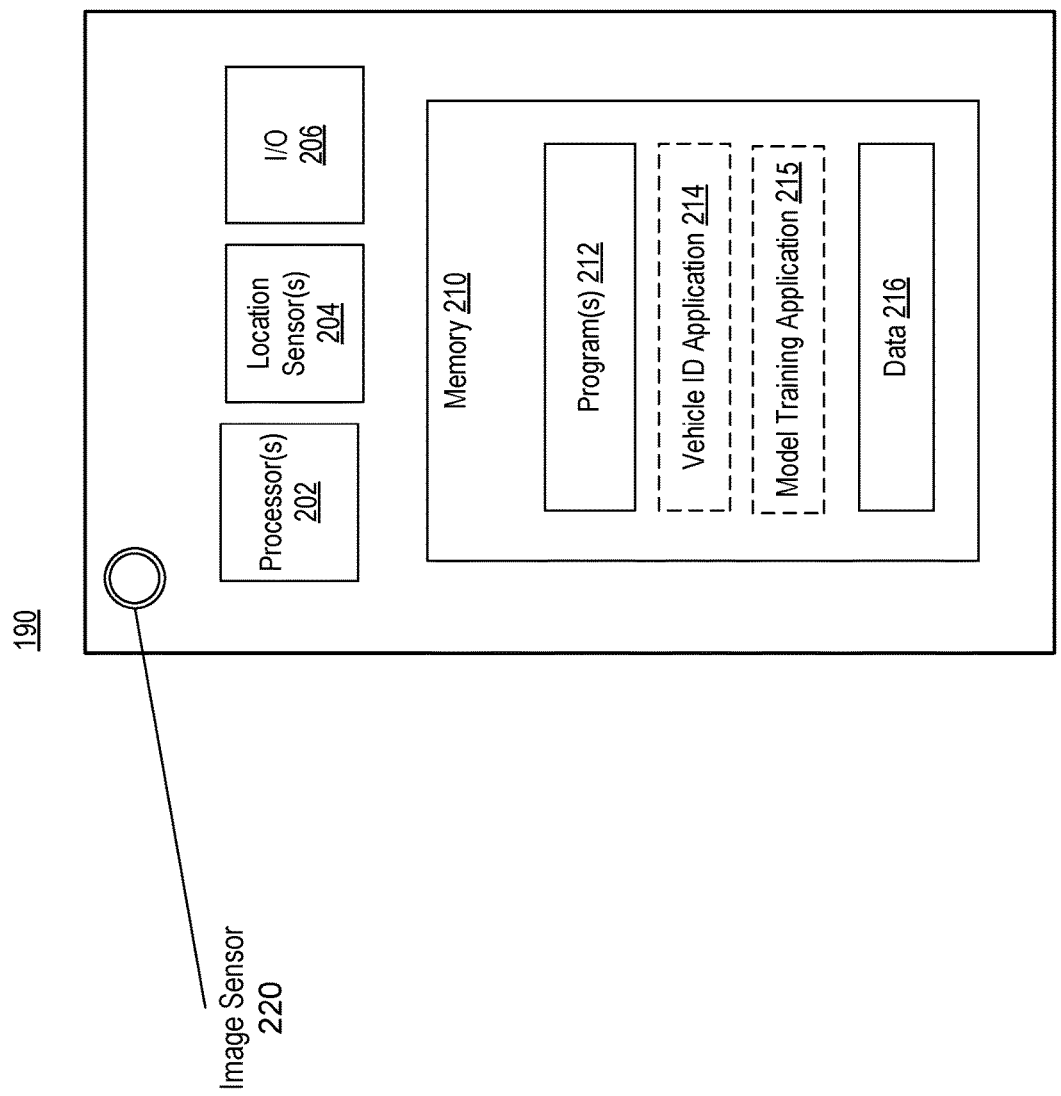
FIG. 2 is a block diagram of an exemplary client device, consistent with disclosed embodiments.

FIG. 2 is a block diagram of client device 190, consistent with disclosed embodiments. In one embodiment, client device 190 may include processor 202, location sensor 204, input/output (I/O) system 206, and memory 210. In some embodiments, client device 190 may take the form of a mobile computing device (e.g., a wearable device, a smartphone, a tablet, a laptop, or similar device), a desktop (or workstation or similar device), or a server. Alternatively, client device 190 may be configured as a particular apparatus, embedded system, dedicated circuit, and the like based on the storage, execution, and/or implementation of the software instructions that perform operations consistent with the disclosed embodiments. According to some embodiments, client device 190 may be configured to provide a web browser or similar computing application capable of accessing web sites, consistent with disclosed embodiments.

Processor 202 may include one or more known processing devices, such as mobile device microprocessors manufactured by Intel™ or NVIDIA™, or various processors from other manufacturers. As would be appreciated by one of skill in the art, the disclosed embodiments are not limited to a particular processor type.

Memory 210 may include one or more storage devices configured to store instructions for performing operations related to disclosed embodiments. For example, memory 210 may be configured with software instructions, such as program 212, that when executed by processor 202, can cause client device 190 to perform operations according to the disclosed embodiments. The disclosed embodiments are not limited to separate programs or computers configured to perform dedicated tasks. For example, client device 190 can be configured to perform the disclosed functions of client device 190 by one or more programs stored in memory 210 (e.g., program 212). In some aspects, memory 210 can be configured to store data 216 used by one or more programs 212.

In certain embodiments, memory 210 may store a vehicle identification application 214 and/or a model training application 215 which may be executed by processor(s) 202 to perform one or more processes consistent with disclosed embodiments. In certain aspects, vehicle identification application 214, or another software component, may be configured to request identification from server system 105 or determine the location of client device 190.

Location sensor 204 may include sensor(s) and/or system (s) capable of determining a location of client device 190, such as a Global Positioning System (GPS) receiver, Bluetooth transceiver, or WiFi transceiver. When location sensor 204 includes multiple sensor(s) and/or system(s), client device 190 can be configured to determine geographic coordinates or identifiers, such as latitude or longitude based on data provided from multiple sensor(s) and/or system(s). Client device 190 can be configured to send the geographic coordinates or identifiers determined by location sensor 204 to other components of system 100 via, for example, network 170.

I/O system 206 may include one or more devices configured to allow data to be received and/or transmitted by client device 190 and to allow client device 190 to communicate with other machines and devices, such as other components of system 100. For example, I/O system 206 may include a screen for providing information to the user. I/O system 206 may also include components for NFC communication. I/O system 206 may also include one or more digital and/or analog devices that allow a user to interact with client device 190 such as a touch-sensitive area, buttons, or microphones. I/O system 206 may also include one or more accelerometers to detect the orientation and inertia of client device 190. I/O system 206 may also include other components known in the art for interacting with server system 105.

In some embodiments, client device 190 may include an image sensor 220 (e.g., a digital camera). Image sensor 220 can be configured to capture images or video and send it to other components of system 100 via, for example, network 170.

The components of client device 190 may be implemented in hardware, software, or a combination of both hardware and software, as will be apparent to those skilled in the art.

Figure 3:
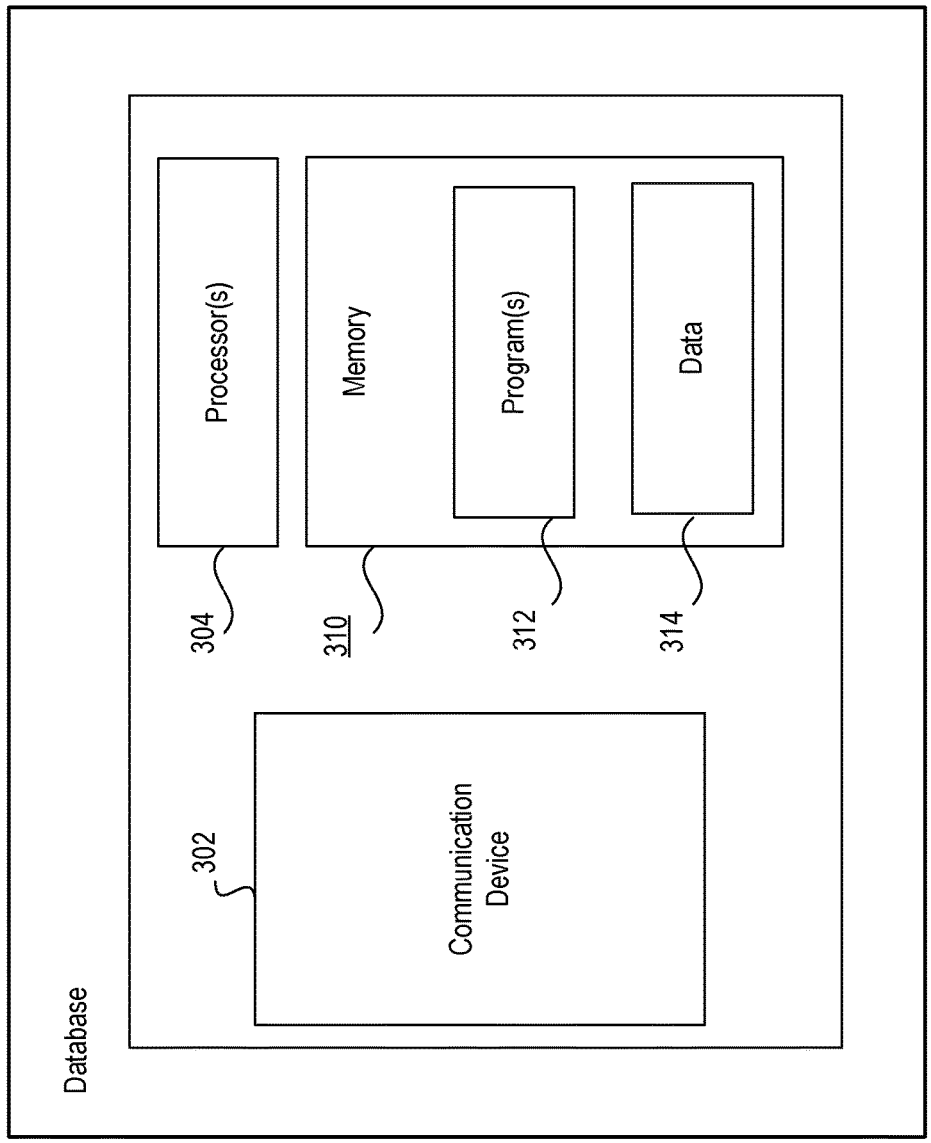
FIG. 3 is a block diagram of an exemplary database, consistent with disclosed embodiments.

FIG. 3 is a block diagram of an exemplary database 180, consistent with disclosed embodiments. Database 180 may include a communication device 302, one or more database processors 304, and database memory 310 including one or more database programs 312 and data 314. In some embodiments, database 180 may be hosted on one or more computing devices (e.g., desktops, workstations, servers, and computing clusters).

Communication device 302 may be configured to communicate with one or more components of system 100, such as online resource 106, comparison resource 107, server system 105, model generator 120, image classifier 130, and/or client device 190. In particular, communication device 302 may be configured to provide to model generator 120 and image classifier 130 images of vehicles that may be used to generate a convolutional neural network or an identification model.

The components of database 180 may be implemented in hardware, software, or a combination of both hardware and software, as will be apparent to those skilled in the art. For example, although one or more components of database 180 may be implemented as computer processing instruction modules, all or a portion of the functionality of database 180 may be implemented instead in dedicated electronics hardware.

Data 314 may be data associated with websites, such as online resource 106. Data 314 may include, for example, information from websites of vehicle dealers or vehicle manufacturers. Data 314 may include stored images of vehicles and information of vehicles, such as cost, condition, and dealers offering the vehicle. Data 314 may include vehicle inventory information fora particular vehicle dealership. For example, data 314 may include a map of a dealership lot and include specific location information for each vehicle in the dealership based on the map.

Figure 4:
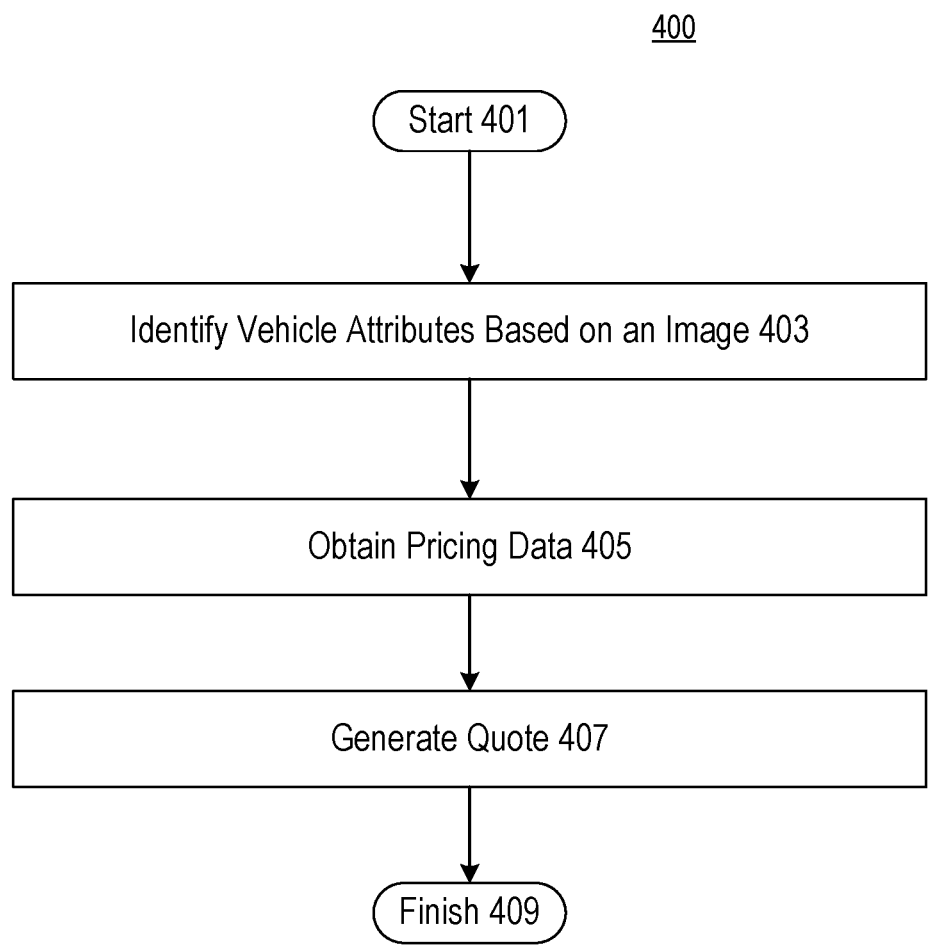
FIG. 4 is a flowchart of an exemplary method for generating a real-time quote for a vehicle employing an image recognition model, consistent with embodiments of the present disclosure.

FIG. 4 is a flowchart of an exemplary method 400 for generating a real-time quote for a vehicle, consistent with embodiments of the present disclosure. Method 400 can include the steps of identifying vehicle attributes based on an image, obtaining pricing data, and generating a quote. Method 400 can be performed using system 100. In some embodiments, one or more steps of method 400 can be performed by client device 190. In various embodiments, one or more steps of method 400 can be performed by system 105. In certain embodiments, method 400 can be performed entirely by system 105 (or by client device 190).

After starting in step 401, the method proceeds to step 403 in which system 100 identifies vehicle attributes based on an image. In some embodiments, identification of vehicle attributes can be performed using system 105. For example, system 105 can be configured to use image recognizer 110 to identify vehicle attributes. In some aspects, image recognizer 110 can be configured to use a model generated by model generator 120. In some aspects, system 105 can be configured to receive the image from client device 190. In various embodiments, identification of vehicle attributes can be performed using client device 190. For example, client device 190 can be configured to receive a model generated by model generator 120. In various aspects, client device 190 can be configured to obtain an image (e.g., using image sensor 220). Client device 190 can be configured to apply this image to the model to identify vehicle attributes.

In some aspects, vehicle images can be retrieved from a database associated with one or more dealerships and/or vehicle manufacturers (e.g., database 180). In some aspects, this database can include records associating images with vehicle attributes. For example, a record can include one or more images of a vehicle and one or more vehicle attributes for that vehicle. As an additional example, a record could include images of a Chevrolet Bolt and the vehicle attributes "Chevy" and "Bolt". In some embodiments, system 100 can be configured to create the records by extracting the vehicle attributes from the images stored in the database. In various aspects, the vehicle images can be retrieved using one or more of the vehicle attributes identified in step 403. For example, images of vehicles with one or more attributes similar to those vehicle attributes identified in step 403 can be retrieved. As an additional example, when the vehicle attributes "Chevy" and "Bolt" are extracted from the original image in step 403, the record described above could be identified, and the associated images of the Chevy Bolt retrieved. In various embodiments, images can be retrieved in this manner by client device 190 or system 105.

System 100 can be configured to determine that the original image and the one or more retrieved images are similar, when the comparison satisfies a matching criterion. In some aspects, system 100 can identify vehicle attributes of the original image based on the potential vehicle attributes identified in step 403 and the vehicle attributes associated with the one or more retrieved images. For example, system 100 can be configured to select the potential vehicle attributes as the actual vehicle attributes when they match the vehicle attributes associated with the one or more retrieved images. As an additional example, system 100 can be configured to select the vehicle attributes associated with the one or more retrieved images as the actual vehicle attributes. For example, the vehicle image can be retrieved by make and model, and the value for trim and year can be selected from the vehicle attributes associated with the one or more retrieved images. In this manner, the potential vehicle attributes can be used to retrieve a limited number of images from the database, reducing the number of required image comparisons to determine the actual vehicle attributes.

Furthermore, vehicle attributes may be identified using convolutional neural networks, consistent with embodiments of the present disclosure. In some embodiments, an image can be obtained using an image sensor 220 or retrieved from a database (e.g. database 180), and system 100 can extract features relevant to machine learning, such as feature vectors from the retrieved image. In some embodiments, these feature vectors can be extracted by inputting the image, or a version of the image, into a first convolutional neural network. The first convolutional neural network can be configured to output the feature vectors. For example, a component of system 100 (e.g., client device 190 or system 105) can extract vehicle attributes from the feature vectors. In some embodiments, these feature vectors can be extracted by inputting feature vectors into a second convolutional neural network. In some embodiments, the second convolutional neural network can be distinct from the first convolutional neural network. The second convolutional neural network can be configured to output indications of the vehicle attributes.

In some embodiments, a component of system 100 (e.g., client device 190 or system 105) can calculate a comparison metric. For example, this calculation can involve inputting the feature vectors extracted from the database image and the feature vectors extracted from the mobile device image into a classifier, such as another neural network. In additional embodiments, a component of system 100 can be configured to calculate values of a metric based on the extracted feature vectors (e.g., an inner product of the feature vectors extracted from the database image and the feature vectors extracted from the mobile device image). A value of the metric can indicate the degree of similarity between the images. In some instances values of the metric can increase with increasing similarity. In various instances values of the metric can decrease with increasing similarity. A component of system 100 (e.g., client device 190 or system 105) may also determine whether the calculated comparison metric satisfies a matching criterion. For example, when the metric value increases with increasing similarity, the matching criterion can be satisfied when a value of the metric exceeds a threshold value, and a component of system 100 (e.g., client device 190 or system 105) can identify the image as either a similar image or a dissimilar image. System 100 can be configured to rely upon this determination when confirming identification of a vehicle.

In step 405, system 100 obtains pricing data. In some embodiments, the pricing data can be obtained using system 105. For example, system 105 can be configured to obtain pricing data from one or more of database 180, online resource 106, or comparison resource 107. As an additional example, system 105 can be configured to obtain data 314 from database 180. As a further example, system 105 can be configured to obtain from comparison resource 107 at least one of pricing information, vehicle-related information, and personal information. As an additional example, system 105 can be configured to obtain from online resource 106 at least one of information retrieved from the website of a vehicle manufacturers and/or vehicle dealer. In some aspects, system 105 can be configured to receive information concerning a user from client device 190. In various embodiments, the pricing data can be obtained using client device 190. For example, client device 190 can be configured to interact with at least one of a user, database 180, online resource 106, or comparison resource 107 to obtain the pricing data.

In step 407, system 100 can be configured to generate a quote for purchase of a vehicle. The quote can depend on the pricing data gathered in step 405. For example, the quote can include at least one of a vehicle price, monthly payment amount, APR, term length, or amount financed based on the pricing data. In some embodiments, the quote can be generated by system 105. In various embodiments, the quote can be generated by client device 190. After step 407, method 400 can end at step 409.

Figure 5:
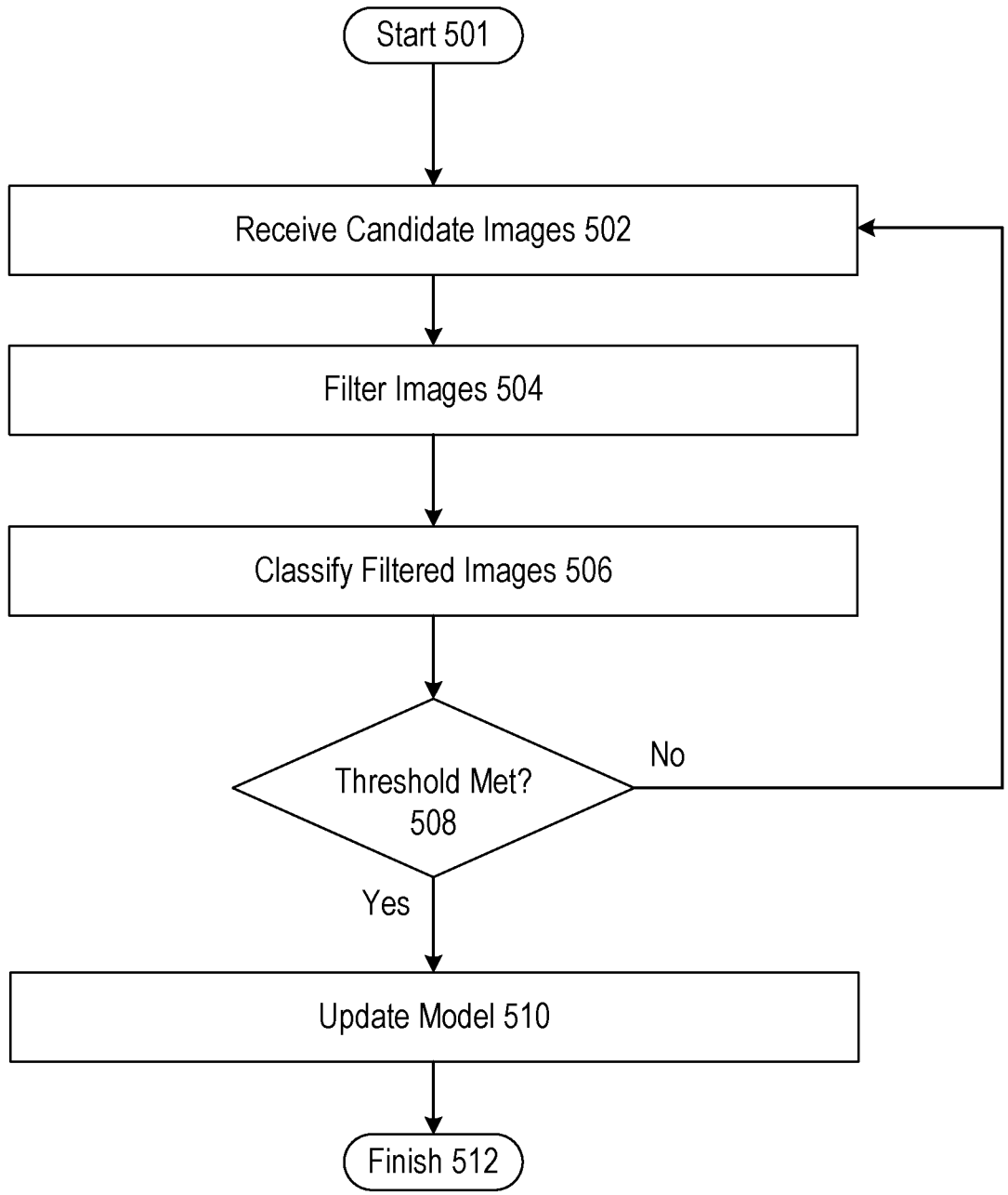
FIG. 5 is an exemplary flow chart illustrating an image recognition model updating process, consistent with disclosed embodiments.

FIG. 5 is a flowchart of an exemplary method 500 for updating an image recognition model, consistent with embodiments of the present disclosure. The image recognition model may be employed to recognize objects such as vehicles, for example as described above in relation to FIG. 4. Method 500 can be performed using system 100. In some embodiments, one or more steps of method 500 can be performed by client device 190. In various embodiments, one or more steps of method 500 can be performed by system 105. In certain embodiments, method 500 can be performed entirely by system 105 (or by client device 190).

In step 502, system 100 may receive candidate images for use in training the image recognition model. The images may be received from client device 190, online resource 106, database 180, or any other component of system 100, and may represent, for example, new vehicles introduced to a sales market, new inventory at a dealership, newly released models of vehicles, or the like. The candidate images may reflect vehicle attributes in the form of metadata, may be received alongside information indicating vehicle attributes, and/or vehicle attributes may be determined using any of the methods described above.

For example, in some embodiments, the candidate images may be received along with vehicle inventory information. The vehicle inventory information may include a listing of every vehicle available at the dealership and related information. Related information may include a vehicle make, model, vehicle identification number, color, trim line, mileage, and/or other identifying information of a vehicle. Related information may also include images of the exterior and/or interior of the vehicle. In some embodiments, related information can include the specific location of the vehicle in the dealership based on a map of the dealership lot.

At step 502, system 105 may initiate an image collection tool. In some embodiments, the image collection tool may be a web scraper configured to collect images from websites. In other embodiments, collection tool may include a file synchronization tool that is connected to, for example, online resource 106. In such embodiment, the image collection tool may copy image files in a memory such as memory 160.

As part of the receiving at step 502, system 100 may compress images or create a new file to efficiently store the plurality of collected images. For example, server system 105 may store images in a new file in that reduces the color space to the most common colors in the image. Alternatively, server system 105 may modify pixels in the image so they only reference an index color, or to combine pixels with dithering. Other compression techniques to generate new files are also possible once the candidate images are received in step.

In some embodiments, the newly generated file may change brightness by averaging or dropping some of the chrominance information in the image. In yet other embodiments, the new file may be generated by employing a Fourier-related transform such as the Discrete Cosine Transform (DCT), wavelet transform, or Fractal compression to generate a new file that more efficiently store the collected images to generate the models.

Additionally or alternatively, server system 105, as part of the receiving of step 502, may perform a preliminary search in metadata associated with the collected images. For example, server system 105 may search for keywords in the metadata or search for relevant XML information. Because the number of collected images may be very large to train the machine learning process, performing a preliminary search, instead of a full search in the metadata, may save computer resources and accelerate the classification process. Server system 105 may perform a search for attributes in metadata. For example, server system 105 may search for vehicle-related words such as "exterior," "interior," "car," "vehicle," "front view," "side view," "rear view," "Ford," "Honda," "2006," "2007," "XL," "4L," "horsepower," or the like.

In step 504, system 100 may filter the candidate images. Filtering may be performed to reduce the number of candidate images to include those most likely to improve the image recognition model. Filtering may be performed to reduce the number of candidate images based on constraints on the number of images for a particular combination of one or more attributes for a vehicle, such as make, model, trim, body style, year, generation, and the like.

Figure 6:
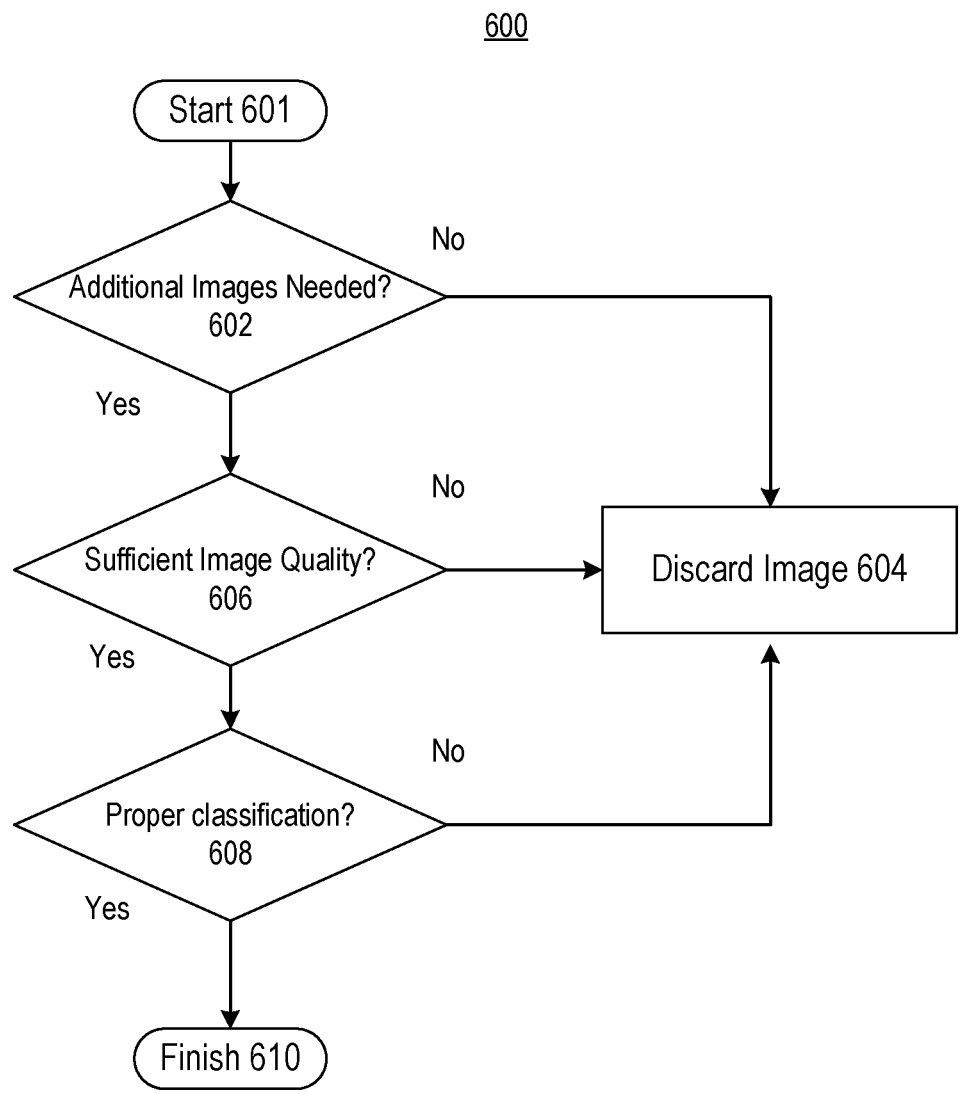
FIG. 6 is an exemplary flow chart illustrating a candidate image filtering process, consistent with disclosed embodiments.

FIG. 6 is a flowchart of an exemplary method 600 for filtering images, consistent with embodiments of the present disclosure. In some embodiments, method 600 may be an example of the filtering in step 504 of method 500 (FIG. 5). Method 600 can be performed using system 100. In some embodiments, one or more steps of method 600 can be performed by client device 190. In various embodiments, one or more steps of method 600 can be performed by system 105. In certain embodiments, method 600 can be performed entirely by system 105 (or by client device 190).

Method 600 may start at step 601, for example after receiving candidate images at step 502 of method 500.

In step 602, system 100 may determine whether additional images of a type in question are needed by system 100. For example, system 100 may be configured to limit the number of images for a particular combination of one or more attributes for a vehicle, such as make, model, trim line, body style, year, generation, or the like to a predetermined number. As an example, system 100 may be configured to limit the number of images of a particular make, model, body style, and generation of a vehicle to 200 images. At step 602, system 100 may determine the number of existing images of the make, model, body style, and generation (or any other designated set of attributes) and compare the number to a predetermined limit. If the number is already at or above the limit, no additional images are needed (step 602: No), and method 600 may pass to step 604. If the number of existing images with the designated set of attributes is below the limit additional images may be needed (step 602: Yes), and method 600 may pass to step 606.

In step 604, system 100 may discard a candidate image. In some embodiments, discarding the image may include deleting the image, for example, to save computing resources, protect privacy, free storage space, etc. In other embodiments, discarding the image may merely include disregarding it from further consideration as to updating the image recognition model.

In step 606, system 100 may determine whether the candidate image is of sufficient image quality for use in training the image recognition model. For example, server system 105 may determine whether the image is acceptable for processing, by performing a validity assessment of whether the contrast in the image is high enough or whether the format of the image can be processed. In some embodiments, server system 105 may determine if the image displays a full vehicle by, for example, analyzing contrast in the image.

In step 608, server system 105 may determine whether metadata of the candidate image includes information about a classification of the vehicle and/or attributes of the vehicle. For example, server system 105 may determine that the word "exterior" is in the comments section of the metadata associated with a group of images and determine that the metadata includes a classification. Similarly, server system 105 may determine that the word "Camry" is in the comments section of the metadata associated with a group of images and determine that the metadata includes an attribute (in this case, that the "model" attribute has the value "Camry"). Alternatively or additionally, server system 105 may identify that the metadata has information about the image source (e.g., from "www.ford.com") and correlate it to a vehicle manufacturer attribute (e.g., a make of "Ford").

If server system 105 determines that the image is of an improper classification for training the image recognition model (e.g., the image is of the interior of the vehicle) (step 608: No), server system 105 may continue to step 604, discarding the image. However, if server system 105 determines that the image is of a proper classification (e.g., of the exterior of the vehicle) (step 608: Yes), server system 105 may continue to step 610, finishing method 600, after which the method may proceed to step 506 of method 500. As a part of continuing to step 610, server system 105 may add the candidate image to a database of existing images. Classifications based on whether the image is improper or proper may be based on any attribute or attributes. For example, an image from a particular camera angle may be classified as improper, or an image may be classified as improper for being related to a vehicle, but not a depiction of the vehicle itself.

In an embodiment, at step 608, server system 105 may employ a convolutional neural network to extract a feature vector, and then feed the feature vector into a logistic regression which categorizes the image as an exterior image or a non-exterior image. In another embodiment, a convolutional neural network may be used alone, without a logistic regression.

Returning to FIG. 5, in step 506, system 100 may classify the filtered images. Classification at step 506 may comprise associating candidate images with other candidate images and/or existing images with predetermined categories of like attributes. For example, a candidate image may be classified by make, model, body style, and year.

System 100 may maintain a tally of the number of existing images of existing classifications. FIG. 7 is an example of a dataset 700 displaying such a tally. As shown in dataset 700, the tally may reflect make (e.g., makes 1-7), model (e.g., models A-H), body style (e.g., SUV, Sedan, Wagon, etc.), and year, as well as a number reflecting the number of existing images for that classification.

Returning to FIG. 5, in step 508, system 100 may determine if the classified images satisfy a threshold for updating an image recognition model. For example, a particular minimum number of images may be required in order to expect a model to reliably predict a particular classification after training. In step 508, system 100 may determine whether the addition of the candidate images would result in any classifications meeting this minimum number of images. For example, system 100 may determine whether the candidate images would result in a classification image tally reaching 200 images. If not (step 508: No), method 500 may return to step 502. If, however, the addition of the candidate images would result in a classification meeting this minimum number of images (step 508: Yes), method 500 may proceed to step 510. In some embodiments, in addition to determining whether the candidate images would result in a classification meeting the minimum number of images, system 100 may determine at step 510 whether a predetermined number of classifications meet the minimum number of images. For example, system 100 may determine whether at least 5 classifications would reach the predetermined minimum. The minimum number used at step 510 may be the same as the maximum number discussed above in relation to step 602, or in some embodiments, may be lower than the maximum number discussed above.

In step 510, system 100 may update the image recognition model based on the combination of the existing images and the candidate images.

Figure 8:
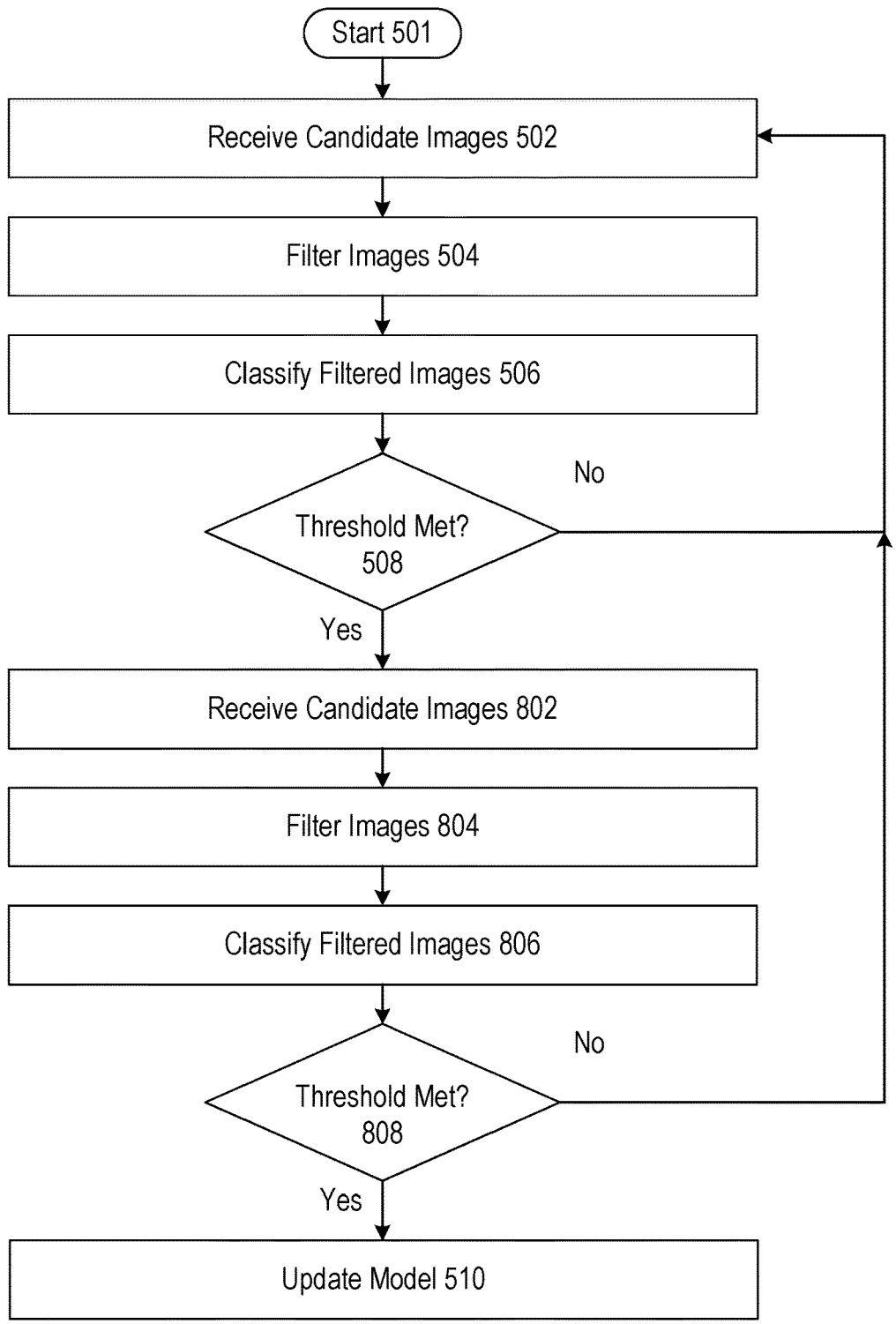
FIG. 8 is an exemplary flow chart illustrating an image recognition model updating process, consistent with disclosed embodiments.

In an embodiment, method 500 may be recursive. For example, one or more steps of method 500 may be carried out more than once in relation to different, or additional attributes. An example is depicted in FIG. 8, which is a flowchart of a method 800, a variation of method 500, consistent with embodiments of the present disclosure. Method 800 may proceed substantially the same as method 500 with respect to steps 502, 504, 506, 508, and 510. Method 800 may, however, include an additional threshold 808 in additional to threshold 508. Threshold 808 may determine more specific or additional threshold for updating the image recognition model.

In an embodiment, at step 508, system 100 may determine whether the total tally of a particular make and model exceeds a predetermined number. As an example, at step 508, system 100 may determine whether the total number of Make 3, Model C images exceeds 200. Referring back to the example of FIG. 7, Make 3, Model C, includes 28 sedan images, 73 hatchback images, and 155 coupe images. Therefore, system 100 may determine, in the example of FIG. 7, that the total number exceeds the threshold (step 508: Yes). Method 800 may proceed to steps 802, 804, 806 and/or 808. At steps 802, 804, 806, and 808, method 800 may carry out steps similar to steps 502, 504, 506 and 508, respectively, but configured for a different attributes and/or classifications.

For example, after determining whether Make 3, Model C exceeds 200 images in the tally in step 508, method 800 may determine whether one, more than one, or each of the sedan, hatchback, and coupe classifications of Make 3, Model C reflects a tally of at least 50 images. Referring back to FIG. 7, Make 3, Model C, Sedan only reflects a tally of 28, which may not exceed the threshold of 50 (step 808: No). Therefore, method 800 may proceed to step 502, similar to step 508. Alternatively, if the threshold of step 808 is met (step 808: Yes), method 800 may proceed to step 510, described above.

Process 800 is merely an example, and any number of additional thresholds may be used consistent with the present disclosure, and may be applied relative to any one or more of the attributes and/or classifications described above.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps. Furthermore, while the methods disclosed have been described in relation to vehicles, those of skill in the art will understand that other objects depicted in images may be used, such as consumer products, heavy equipment, buildings, etc.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for updating an image recognition model, comprising:
   one or more processors; and
   a storage medium storing instructions that, when executed, configure the one or more processors to perform operations comprising:
      storing, in a database, a plurality of images depicting vehicles;
      determining, for a first subset of the vehicle images, that additional images of the vehicles depicted in the first subset are desired;
      determining, for a second subset of the vehicle images, that additional images of the vehicles depicted in the second subset are not desired;
      identifying, within the first subset, images suitable for training an image recognition model;
      assigning a classification to the suitable images;
      determining, based on the classification, whether a first threshold number of images exist in the database; and
      initiating an update of the image recognition model, based on the determination of whether the first threshold number of images exists;
      wherein determining, for a second subset of the vehicle images, that additional images of the vehicles depicted in the second subset are not desired is based on an existing number of images of the depicted vehicles in the database of images exceeding a second threshold number, wherein the second threshold number is a predetermined number of images of a vehicle of a particular make and model, and greater than the first threshold number.

2. The system of claim 1, wherein the image recognition model is a machine learning model.

3. The system of claim 1, wherein determining that additional images of the vehicles depicted in the first subset of images are desired, comprises determining that additional images of the vehicles depicted in the first subset of images are desired based on an existing number of images of the depicted vehicles in the database of images being within the second threshold number.

4. The system of claim 1, wherein the second threshold number is a predetermined number of images of a vehicle of a particular make, model, and trim line.

5. The system of claim 1, wherein the second threshold number is equal to the first threshold number.

6. The system of claim 1, wherein the operations further comprise discarding the second subset of the plurality of images.

7. The system of claim 1, wherein initiating the update comprises generating a notification that an update may begin.

8. The system of claim 1, wherein the first threshold number of images comprises a number of images of a particular classification.

9. The system of claim 1, wherein the first threshold number is based on assignment of at least a predetermined number of classifications not yet incorporated into the image recognition model.

10. The system of claim 9, wherein the predetermined number of classifications is based on a predetermined number of images assigned to an individual classification.

11. The system of claim 1, wherein identifying suitable images comprises identifying images depicting a vehicle exterior.

12. The system of claim 1, wherein identifying suitable images comprises identifying images complying with predetermined standards of image quality.

13. The system of claim 1, wherein initiating the update comprises incorporating the suitable images into the database of images.

14. A method for updating an image recognition model, comprising the following operations performed by one or more processors:
 storing, in a database, a plurality of images depicting vehicles;
 determining, for a first subset of the vehicle images, that additional images of the vehicles depicted in the first subset are desired;
 determining, for a second subset of the vehicle images, that additional images of the vehicles depicted in the second subset are not desired;
 identifying, within the first subset, images suitable for training an image recognition model;
 assigning a classification to the suitable images;
 determining, based on the classification, whether a first threshold number of images exist in the database; and
 initiating an update of the image recognition model, based on the determination of whether the first threshold number of images exists;
 wherein determining, for a second subset of the vehicle images, that additional images of the vehicles depicted in the second subset are not desired is based on an existing number of images of the depicted vehicles in the database of images exceeding a second threshold number, wherein the second threshold number is a predetermined number of images of a vehicle of a particular make and model, and greater than the first threshold number.

15. A non-transitory computer-readable medium storing instructions that, when executed by a processor, cause the processor to perform operations comprising:
 storing, in a database, a plurality of images depicting vehicles;
 determining, for a first subset of the vehicle images, that additional images of the vehicles depicted in the first subset are desired;
 determining, for a second subset of the vehicle images, that additional images of the vehicles depicted in the second subset are not desired;
 identifying, within the first subset, images suitable for training an image recognition model;
 assigning a classification to the suitable images;
 determining, based on the classification, whether a first threshold number of images exist in the database; and
 initiating an update of the image recognition model, based on the determination of whether the first threshold number of images exists;
 wherein determining, for a second subset of the vehicle images, that additional images of the vehicles depicted in the second subset are not desired is based on an existing number of images of the depicted vehicles in the database of images exceeding a second threshold number, wherein the second threshold number is a predetermined number of images of a vehicle of a particular make and model, greater than the first threshold number.

* * * * *